3,062,768
HEAT-SENSITISING POLYMER LATICES WITH A POLYACETAL

Hanswilli von Brachel and Heinz Esser, Koln-Sulz, and Erwin Müller, Leverkusen, Germany, assignors to Farbenfabriken Bayer Aktiengesellschaft, Leverkusen, Germany, a corporation of Germany
No Drawing. Filed Oct. 7, 1958, Ser. No. 765,735
Claims priority, application Germany Oct. 14, 1957
7 Claims. (Cl. 260—29.7)

This invention relates to heat-sensitisers for latices.

It is known that so-called heat-sensitisers can be added to rubber latex, synthetic rubber and plastic dispersions. The purpose of these heat-sensitisers is to coagulate the rubber, or the plastic, on heating. In the manufacture of moulded or dipped articles, this coagulation takes place on the surface of a heated mould with formation of a solid film, whereas in the production of foam rubber, the entire latex, beaten into a foam, solidifies while retaining its moulded and foam structure. Further uses for these heat-sensitive mixtures are found in the impregnation of textiles and paper. In all cases, the coagulated latex, or plastic, can be vulcanised, by mixing with added vulcanisers, after coagulation has taken place.

It has now been found that water-soluble polyacetals are very suitable for use as heat sensitisers for latices of high polymers.

The polyacetals used for the new process can be prepared by known methods, for example by condensation of aldehydes such as paraformaldehyde, or aqueous formaldehyde, with glycols or hydroxalkylated glycols in the presence of catalytically acting acids, such as p-toluene sulphonic acid, hydrochloric acid, phosphoric acid, trichloroacetic acid, zinc chloride or potassium bisulfate. Furthermore, polyacetals according to the invention can be prepared by polyaddition of glycols to divinyl ethers of glycols by the process according to German patent application B 27,045/39c, filed August 17, 1953.

Examples of the glycols used in this process are: ethylene glycol, diethylene glycol, triethylene glycol and their higher homologues, propylene glycol, dipropylene glycol, tetrapropylene glycol and higher homologues, butanediol, pentanediol, hexanediol, octanediol thiodiglycol and also their substitution products such as the alkyl or aryl compounds and hydroxalkylation products, such as, for example, the reaction products of the glycols with ethylene oxide, propylene oxide, isobutylene oxide, cyclohene oxide, styrene oxide etc. It is possible for use the derivatives of formaldehyde, acetaldehyde, benzaldehyde, chloracetaldehyde, furfurole or other aldehydes as acetals, but the acetals of formaldehyde are preferred. In certain cases, when preparing the polyacetals, it is also possible to work in the presence of monohydric or tri- and higher hydric alcohol, such as for example methyl alcohol, ethyl alcohol, butyl alcohol or benzyl alcohol or trimethylol propane, glycerine, butane, triolpentaerythritol or their hydroxalkylation products. Following their production the polyacetals, prepared without the addition of these alcohols, can also be further reacted with these alcohols under the conditions requisite for acetalisation or reacetalisation. The hydroxy groups of the hydroxyacetals can also be esterified or etherified by reacting them with, for example, acid anhydrides or acid chlorides, or by adding their OH groups to compounds having reactive double bonds such as, for example, acrylonitrile, vinyl ethyl sulphone, vinyl methyl ketone and the like. With the process of the invention, it is preferable to use polyacetals of glycols and/or hydroxalkylated glycols which contain at least one oxygen atom to 4 carbon atoms. Furthermore, the polyacetals which are preferred are those with a molecular weight exceeding 400 up to about 50,000, preferably 10,000. The polyacetals used shall be water-soluble and preferably those are used which are at least to 0.1 percent soluble in water of 18° C.

Besides the latex of natural rubber there are suitable also the latices and dispersions of synthetic rubber-like polymers which can be obtained for example from conjugated diolefins such as butadiene, dimethyl-butadiene, isoprene and their homologues or copolymers of conjugated diolefins with polymerizable vinyl compounds such as styrene, α-methyl styrene and their substitution products, acrylonitrile, methacrylonitrile, acrylates and methacrylates and similar compounds or copolymers which are obtained from iso-olefins such as isobutylene and its homologues with a small amount of conjugated diolefins. Furthermore there are suitable polymerizates obtained from chlorobutadiene and its copolymerizates obtained with mono- and/or diolefins or other polymerizable vinyl compounds.

Furthermore there can be used, e.g., the latices of high polymer-plastics, such as polyvinyl acetate, polyacrylic acid esters, polyvinyl chloride etc. The polyacetals used for the process of the invention can be added to the latices of high polymers in varying amounts, e.g., in amounts of 0.1 to 10 percent by weight based on the amount of the high polymer.

The latices used can furthermore contain the usually applied compounds such as sulfur, fillers, vulcanisation accelerators, antioxidants, activators, such as zinc oxide, plasticizers or substances which make the vulcanisates only difficultly inflammable.

One advantage of the use of polyacetals according to the invention consists in that the properties of the heat sensitising agents can be varied to a large extent during their manufacture by variation of the reaction components, or their proportions, or by varying the molecular weight of the polyacetals. Thus for example it is possible by such a variation to obtain rubber or plastic dispersions or emulsions with coagulation points between 25° C. and 90° C., which are characterised by a particularly low concentration of sensitising agent. An additional advantage of the use of polyacetals according to the invention is to be seen in the fact that they are excellently suitable for mixing with water in the cold state, so that they can even be dissolved at the place of application. Furthermore, the coagulates which are formed are not thereby made tacky and they can be completely broken down and removed quantitatively by a brief treatment with acidified water.

The following examples further illustrate the present invention without, in any way, limiting it thereto.

Example 1

To a rubber latex mixture of the following composition:

100 grams of natural rubber=167 grams of rubber latex 60%
2.5 grams of zinc oxide
2.5 grams of sulfur
0.8 gram of zinc diethyl dithiocarbamate
5.8 grams of methylene-bis-(sodium naphthalene sulfonic acid)
0.4–0.6 gram of stabiliser (hydroxyethylated polycyclic phenol)
7 grams of formaldehyde (30%)

is added 5 to 15 cc. of a 15 percent aqueous solution of the polyacetal. The exact quantities, the coagulation points produced and the composition of the polyacetals will be seen from the following table:

| Composition of the polyacetal | Mol. weight | Sensitiser in cc. | Stabiliser in g. | Coagulation temperature °C. |
|---|---|---|---|---|
| 1 Mol. of butyl-1, 4-di (hydroxyethyl-ether)+1.2 mol of paraformaldehyde | 5,220 | 5 | 0.4 | 36 |
| Do. | 1,670 | 10 | 0.4 | 40 |
| 4 Mols of butyl 1, 4-di (hydroxyethyl-ether)+1 mol. of triethylene glycol+6 mols of paraformaldehyde | 3,060 | 10 | 0.4 | 51 |
| Do. | 2,420 | 15 | 0.6 | 52 |
| 4 Mols of butyl 1, 4-di (hydroxyethyl-ether)+1 mol of octaethylene glycol+6 mols of paraformaldehyde | 2,500 | 5 | 0.4 | 59 |
| Do. | 1,890 | 15 | 0.6 | 63 |
| 4 mols of butyl 1, 4-di (hydroxyethyl-ether)+1 mol of dodecaethylene glycol+6 mols of paraformaldehyde | 3,000 | 10 | 0.4 | 71 |

The polyacetals referred to above are prepared by the following process:

5 grams of p-toluene-sulfonic acid are added to 5 mols of butanedioxethyl glycol and 6 mols of paraformaldehyde and the mixture is heated in a distillation apparatus at 80–90° C. until the paraformaldehyde has dissolved; the water which has formed is then distilled off in vacuo at 60–80° C. until the desired molecular weight is reached. After being condensed for 12 hours, for example, a molecular weight of 1670 is obtained, while after 24 hours condensation, a molecular weight of 4220 is reached in this case. The reaction product can be neutralised if desired with alkali or ammonia.

The other polyacetals can be obtained by the same general procedure.

Example 2

To a synthetic latex of the following composition:

100.0 grams of poly-2- chlorobutadiene=200 grams of poly-2-chlorobutadiene latex (50%)
5.0 grams of zinc oxide
1.0 gram of sulfur
1.5 grams of zinch diethyldithiocarbamate
5.8 grams of methylene-bis-(sodium naphthalene sulfonic acid)
0.4 gram of stabliser (hydroxyethylated polycyclic phenol)
2.0 to 4.0 grams of aminoacetic acid is added 10–15 cc. of an aqueous 15 percent solution of the polyacetals indicated below. The pH value of the poly-2-chlorobutadiene latex was adjusted to 9.5 with the aminoacetic acid. The exact quantities, the coagulation points produced, and the composition of the polyacetals will be seen from the following table:

| Composition of polyacetals | Mol. weight | Sensitiser in cc. | Coagulation temperature, °C. |
|---|---|---|---|
| (a) 3.0 mols of triethylene glycol +3.0 mols of thiodiglycol +7.0 mols of paraformaldehyde | 2,500 | 10.0 | 44 |
| (b) 2.5 mols of butyl-1,3-di(hydroxyethyl) ether +3.0 mols of paraformaldehyde | 2,400 | 15.0 | 50 |
| (c) 3.0 mols of triethylene glycol +2.9 mols of hexane-(1,6)-diol +7.0 mols of paraformaldehyde | 2,200 | 15.0 | 30 |
| (d) 13.2 mols of butyl-1,3-di(hydroxyethyl) ether +2.0 mols of dodecanol +18.0 mols of formaldehyde | 3,000 | 10 | 50 |
| (e) 3 mols of dipropylene-glycol +1 mol of triethylene glycol +4.5 mols of formaldehyde | 2,000 | 15 | 35 |
| (f) 4 mols of tripropylene glycol +5 mols of formaldehyde | 1,800 | 15 | 32 |

Similar results are obtained if, instead of using the above polyacetals, compounds are used in which the free OH groups of the polyacetals have been esterified, for example with acetic acid anhydride, benzoyl chloride or propionic acid anhydride in pyridine, or with phenyl isocyanate, or stearyl isocyanate (in this case it is also possible to work in the absence of a stabiliser) or if the polyacetals are reacted with, for example, acrylonitrile or vinyl ether sulfone in the presence of an alcoholate or if, for example, the polyacetal described under (b) is reacted with 2 mols of vinyl isobutyl ether.

Example 3

250 parts by weight of a 40% aqueous latex of a copolymer of butadiene and styrene are brought with N/10 mineral acid to a pH value of 7.5. Then are added 3.5 parts by weight of methylene-bis-(sodium-naphthalene sulfonic acid), 20 parts by weight of water, 5 parts by weight of zinc oxide, 3 parts by weight of sulfur, 2 parts by weight of zinc dibutyl dithiocarbamate and 10–30 parts by volume of an aqueous 15 percent solution of one of the polyacetals which are described in the foregoing examples. The coagulation point of the resulting mixtures is between 30° C. and 45° C.

Example 4

200 parts by weight of an aqueous 50% latex of a copolymer of butadiene and acrylonitrile, 3.3 parts by weight of methylene-bis-(sodium naphthalene sulfonic acid), 60 parts by weight of water, 5 parts by weight of zinc oxide, 3 parts by weight of sulfur, 0.8 part by weight of 2-mercapto benzthiazole, 0.2 part by weight of diphenyl guanidine and 10–40 parts by weight of an aqueous 15–30% solution of one of the polyacetals, which have been described in the foregoing examples, are mixed together. The coagulation point of the resulting mixtures is between 25° C. and 50° C.

Example 5

The plastic dispersions indicated in the following table are brought with N/10 mineral acid to a pH value of 7.5. Thereafter, 15 to 45 percent by weight (based on the dry weight of the plastic substance) of an aqueous 15% solution of one of the polyacetals which have been described, are added. The mixtures which are obtained show the coagulation points indicated in the table:

Coagulation point, ° C.
(a) Polyvinyl acetate (45% dispersion) _____ 35–40
(b) Polyacrylic acid methyl ester (40% dispersion) _____ 40–50
(c) Polyvinyl chloride (50% dispersion) _____ 32–51

We claim:
1. In a process for heat-sensitizing latices of high polymers selected from the group consisting of natural rubber, homopolymers of conjugated diolefins, copolymers of conjugated diolefins with polymerizable vinyl monomers, copolymers of isoolefins with conjugated diolefins, polychlorobutadiene, copolymers of chlorobutadiene with polymerizable vinyl monomers, polyvinyl acetate, polyacrylic acid esters, and polyvinyl chloride, the improvement comprising adding to the aforesaid latices as the heat-sensitizing agent 0.1–10% by weight, based on the weight of the polymer, of a water-soluble polyacetal of an aldehyde and a member selected from the group consisting of glycols and hydroxyalkylated glycols.

2. Process of claim 1 wherein the water-soluble polyacetal is a condensate of formaldehyde with butyl-1,4-di(hydroxyethyl)ether.

3. Process of claim 1 wherein the water-soluble polyacetal is a condensate of formaldehyde with butyl-1,3-di(hydroxyethyl)ether.

4. In a process for heat-sensitizing natural rubber latex, the improvement comprising adding to said latex as the heat-sensitizing agent 0.1–10% by weight, based on the weight of the polymer, of a water-soluble polyacetal of an aldehyde and a member selected from the group consisting of glycols and hydroxyalkylated glycols.

5. Process of claim 4 wherein said water-soluble polyacetal is a condensate of formaldehyde with a member selected from the group consisting of glycols and hydroxyalkylated glycols.

6. In a process for heat-sensitizing polychlorobutadiene latex, the improvement comprising adding to said latex as the heat-sensitizing agent 0.1–10% by weight, based on the weight of the polymer, of a water-soluble polyacetal of an aldehyde and a member selected from the group consisting of glycols and hydroxyalkylated glycols.

7. Process of claim 6 wherein said water-soluble polyacetal is a condensate of formaldehyde and a member selected from the group consisting of glycols and hydroxyalkylated glycols.

References Cited in the file of this patent

UNITED STATES PATENTS

| | | |
|---|---|---|
| 2,746,885 | Holt | May 22, 1956 |
| 2,786,081 | Kress | Mar. 19, 1957 |
| 2,796,423 | Cottle | June 18, 1957 |
| 2,805,210 | Stoner et al. | Sept. 3, 1957 |
| 2,878,294 | Kress | Mar. 17, 1959 |
| 2,885,443 | Kress | May 5, 1959 |